United States Patent
Guda et al.

(10) Patent No.: US 11,347,648 B2
(45) Date of Patent: May 31, 2022

(54) DIRECT CACHE HIT AND TRANSFER IN A MEMORY SUB-SYSTEM THAT PROGRAMS SEQUENTIALLY

(71) Applicant: MICRON TECHNOLOGY, INC., Boise, ID (US)

(72) Inventors: Chandra M. Guda, Fremont, CA (US); Johnny A. Lam, Firestone, CO (US)

(73) Assignee: Micron Technology, Inc., Boise, ID (US)

( * ) Notice: Subject to any disclaimer, the term of this patent is extended or adjusted under 35 U.S.C. 154(b) by 160 days.

(21) Appl. No.: 16/913,127

(22) Filed: Jun. 26, 2020

(65) Prior Publication Data

US 2021/0406185 A1 Dec. 30, 2021

(51) Int. Cl.
| | |
|---|---|
| *G06F 12/00* | (2006.01) |
| *G06F 12/0871* | (2016.01) |
| *G06F 12/0873* | (2016.01) |
| *G06F 12/0868* | (2016.01) |
| *G06F 12/02* | (2006.01) |
| *G06F 9/54* | (2006.01) |
| *G06F 12/0864* | (2016.01) |

(52) U.S. Cl.
CPC .......... *G06F 12/0871* (2013.01); *G06F 9/544* (2013.01); *G06F 12/0246* (2013.01); *G06F 12/0864* (2013.01); *G06F 12/0868* (2013.01); *G06F 12/0873* (2013.01); *G06F 2212/7201* (2013.01)

(58) Field of Classification Search
CPC .. G06F 12/0871; G06F 9/544; G06F 12/0246; G06F 12/0864; G06F 12/0868; G06F 12/0873; G06F 2212/7201
See application file for complete search history.

(56) References Cited

U.S. PATENT DOCUMENTS

2019/0155723 A1* 5/2019 Park .................... G06F 12/0246

* cited by examiner

*Primary Examiner* — Gurtej Bansal
(74) *Attorney, Agent, or Firm* — Lowenstein Sandler LLP

(57) ABSTRACT

A system includes having buffers and a processing device that receives a read request with a logical block address (LBA) value for a memory device, creates a logical transfer unit (LTU) value, to include the LBA value, that is mapped to a first physical address of the memory device, and generates command tags that are to direct the processing device to retrieve data from the memory device and store the data in buffers. The command tags include a first command tag associated with the first physical address and a second command tag associated with a second physical address that sequentially follows the first physical address. The processor further creates an entry in the read cache table for the buffers. The entry can include a starting LBA value set to the first LBA value and the read offset value corresponding to the amount of data.

20 Claims, 9 Drawing Sheets

FIG. 2

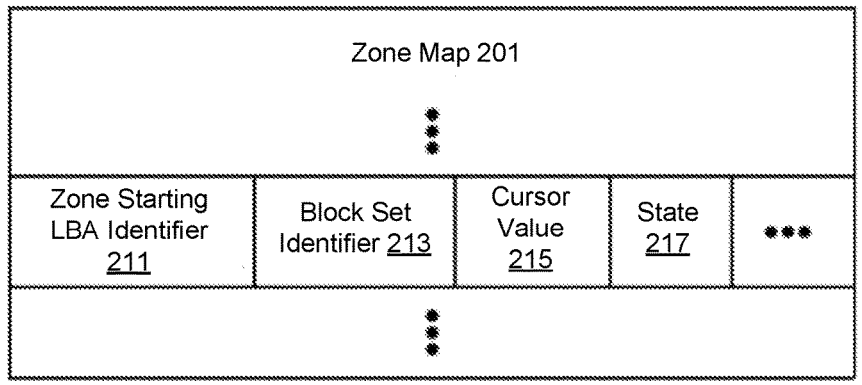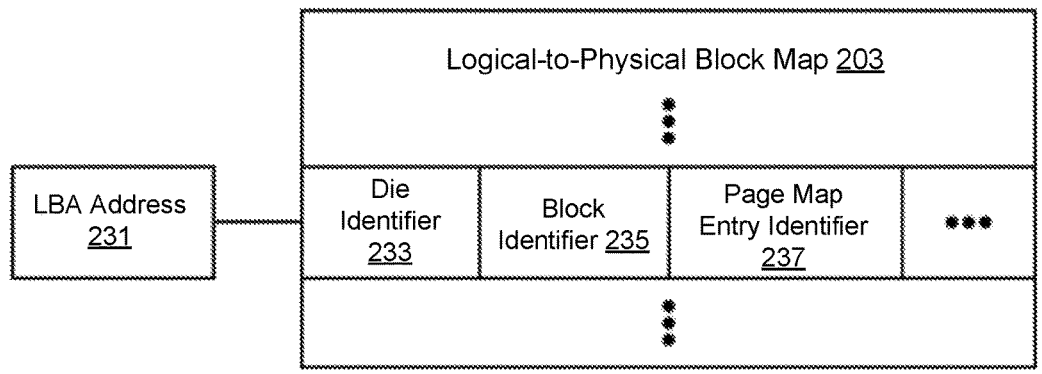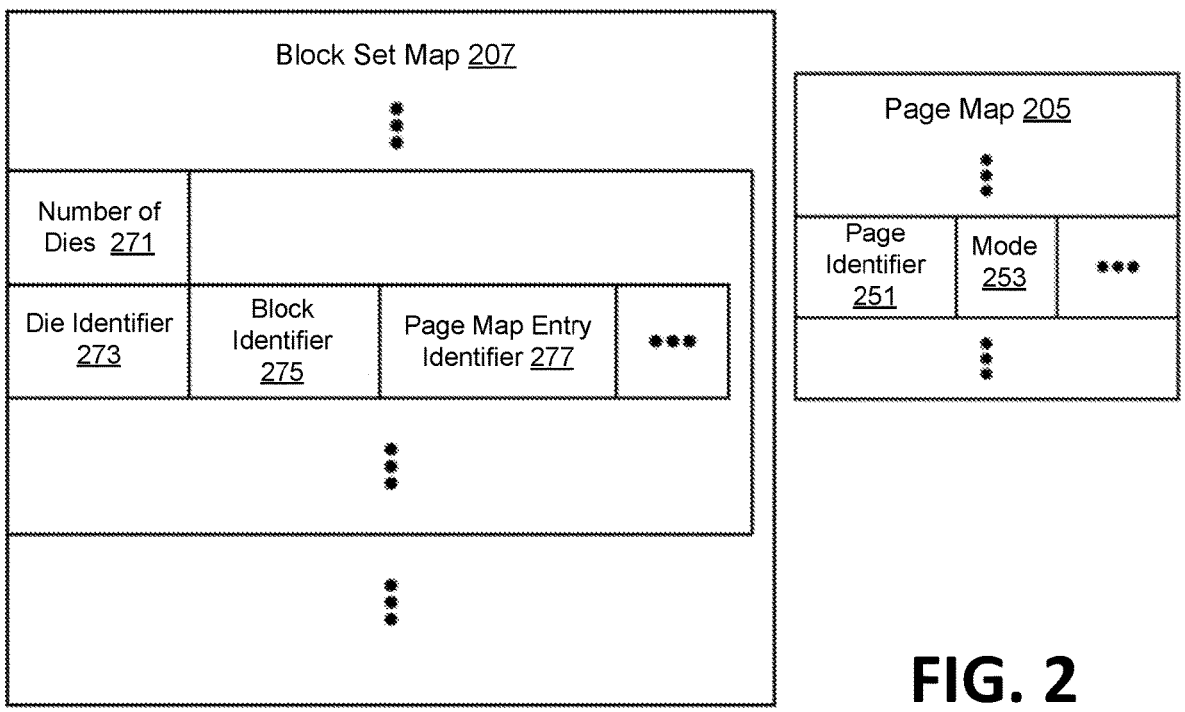
FIG. 2

400

---

Access a read command having a first command tag, the first command tag including a first logical transfer unit (LTU) value and a first buffer address for a first buffer of buffers stored in volatile memory, the first LTU value being mapped from a zone of multiple sequential logical block address (LBA) values to a first physical address of multiple sequential physical addresses, where first data is stored at the first physical address, and the first LTU value contains a first LBA value of the plurality of sequential LBA values. 410

↓

Generate a set of command tags that are to direct a command execution processor of the processing device to retrieve second data from the memory device and store the second data in a set of the buffers, where the set of command tags include a second command tag associated with a second physical address that sequentially follows the first physical address. 420

↓

Create an entry in a read cache table for the set of buffers, where the entry includes a zone identifier for the zone, a starting LBA value set to first LBA, and the read offset value corresponding to an amount of the first data and the second data.
430

┌─────────────────────────────────────────────────────────┐
│ Receive a read request including a first logical block address (LBA) value │
│ of an LBA address space for a memory device, where the first LBA value │
│ belongs to a zone of multiple sequential LBA values that are mapped to │
│ multiple sequential physical addresses.  605 │
└─────────────────────────────────────────────────────────┘
                              ↓
┌─────────────────────────────────────────────────────────┐
│ Create a first logical transfer unit (LTU) value to include the first LBA │
│ value, the first LTU value being mapped to a first physical address of the │
│ memory device.  610 │
└─────────────────────────────────────────────────────────┘
                              ↓
┌─────────────────────────────────────────────────────────┐
│ Allocate a set of buffers in a volatile memory, where a capacity of the set │
│ of buffers matches an amount of data stored at the first physical address │
│ and at subsequent physical addresses that are sequentially numbered │
│ within a read offset value that starts at the first physical address. │
│ 615 │
└─────────────────────────────────────────────────────────┘
                              ↓
┌─────────────────────────────────────────────────────────┐
│ Generate set of command tags that are to direct a command execution │
│ processor to retrieve the data from the memory device and store the data │
│ in the set of buffers, the command tags including at least a first command │
│ tag associated with the first physical address and a second command tag │
│ associated with a second physical address that sequentially follows the │
│ first physical address.  620 │
└─────────────────────────────────────────────────────────┘
                              ↓
┌─────────────────────────────────────────────────────────┐
│ Create an entry in a read cache table for the set of buffers, where the │
│ entry includes a zone identifier for the zone, a starting LBA value set to │
│ the first LBA value, and the read offset value corresponding to the │
│ amount of data. │
│ 625 │
└─────────────────────────────────────────────────────────┘

```
Assign an LTU value, of a set of LTU values, to each command tag of the set
of command tags to generate the set of command tags. 630
```

```
Assign a buffer address of a buffer within the set of buffers to each command
tag of the set of command tags. 635
```

```
Generate a buffer index table, in the volatile memory, to track the LTU value
associated with each command tag of the set of command tags mapped to
the buffer address associated with the LTU value. 640
```

FIG. 6B

```
Retrieve a second LBA value from a subsequent read request received from
a host system. 645
```

```
Determine, via access to the entry in the read cache table, that the second
LBA value: is single a buffer allocation unit offset from the starting LBA value
and thus corresponds to a second LTU value of the set of LTU values; and is
within an LBA value range corresponding to the read offset value.
650
```

```
Index, within the buffer index table, to retrieve a second buffer address
associated with the second LTU value.
660
```

```
Return, to the host system, a second subset of the data retrieved from a
second buffer, of the set of buffers, corresponding to the second buffer
address.
665
```

FIG. 6C ns that programs sequentially. A memory sub-system can be a storage device, a memory module, or a hybrid of a storage device and memory module. Examples of storage devices and memory modules are described below in conjunction with FIG. 1A.

DIRECT CACHE HIT AND TRANSFER IN A MEMORY SUB-SYSTEM THAT PROGRAMS SEQUENTIALLY

TECHNICAL FIELD

Embodiments of the disclosure relate generally to memory sub-systems, and more specifically, direct cache hit and transfer in a memory sub-system that programs sequentially.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2 is a block diagram that illustrates an example of data structures configured to support zone-based mapping according to various embodiments.

FIG. 4 is a flow chart of a method for supporting direct cache hits based on a read command according to an embodiment.

FIG. 6A-6C are flow charts of a method for supporting direct cache hits and transfer according to a related embodiment.

DETAILED DESCRIPTION

Figure 1A:
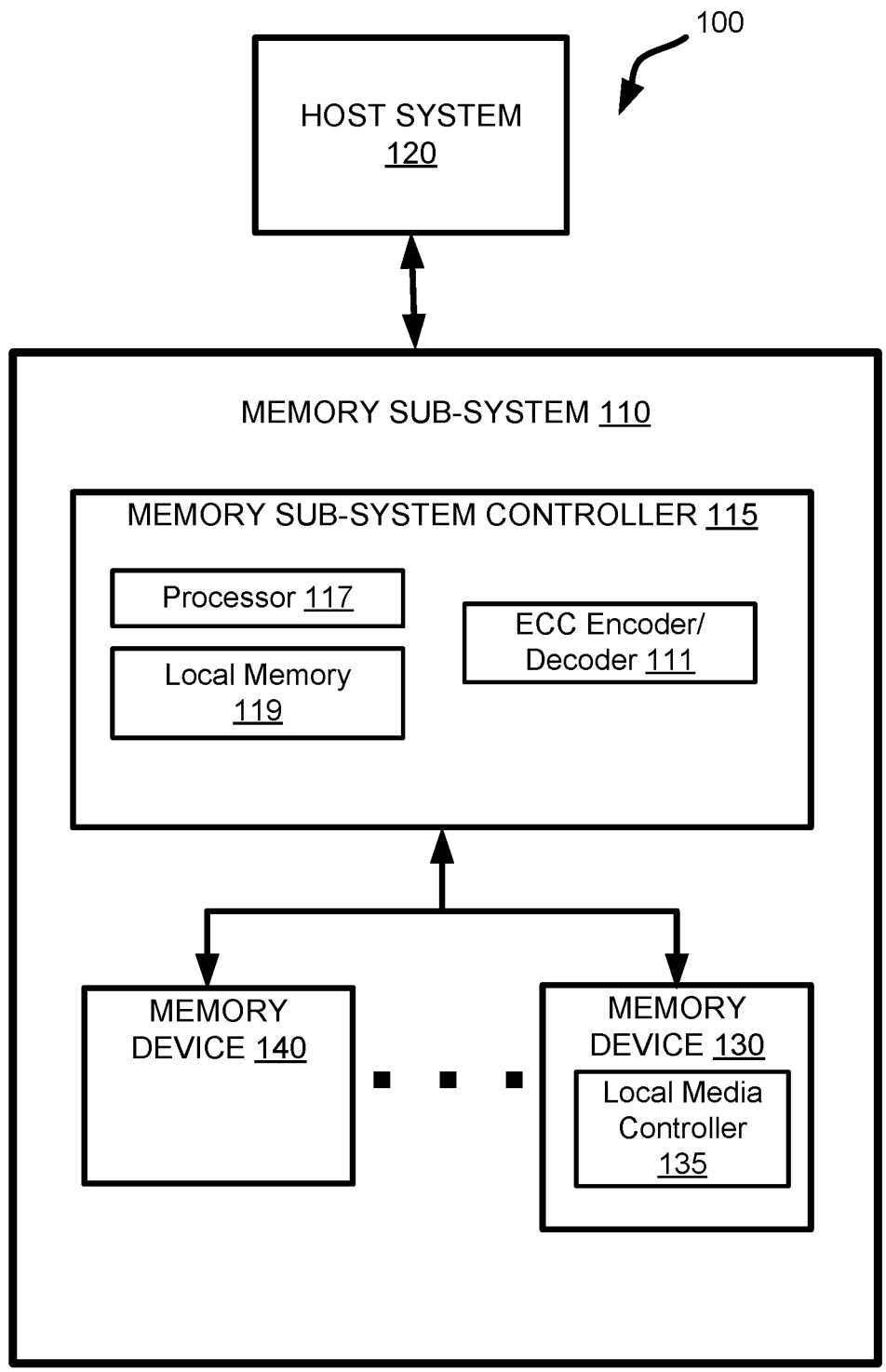
FIG. 1A illustrates an example computing system that includes a memory sub-system according to embodiments.

Aspects of the present disclosure are directed to direct cache hit and transfer in a memory sub-system that programs sequentially. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1A. A non-volatile memory device is a package of one or more dice. The dice in the packages can be assigned to one or more channels for communicating with a memory sub-system controller. The memory sub-subsystem controller is also referred to as "controller" herein below. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data in the memory device at the memory sub-system and to read data from the memory device of the memory sub-system.

The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g., used to distinguish age of data written), valid bitmap (which LBA values or logical transfer units contain valid data), and the like. For simplicity, where "data" is referred to hereafter, such data can be understood to refer to at least host data, but can also refer to other data such as media management data and/or system data.

A memory sub-system can use a striping scheme to treat various sets of data as units when performing data operations (e.g., write, read, erase). A LUN stripe is a collection of planes that are treated as one unit when writing, reading, or erasing data. Each plane in a LUN stripe can carry out the same operation, in parallel, of all of the other planes in the LUN stripe. A block stripe is a collection of blocks, one from each plane in a LUN stripe, that are treated as a unit. The blocks in a block stripe have the same block identifier (e.g., block number) in their respective planes. A block stripe (also hereinafter referred to as a block set) can be a set of blocks arrayed across planes of different dice, such that the blocks are grouped together for purposes of data storage. Writing to block stripes allows more host data that can be concurrently written and read at the same time across multiple dice. Multiple blocks of one or more block set can be identified as a data group.

A host file system can group host data by locality and write the host data sequentially to the memory device(s) of the memory sub-system. File systems can then write host data of different localities as parallel sequential streams to memory devices, each stream having its own locality, e.g., where different host applications can each write to its own stream. "Locality" can refer to either temporal locality or spatial locality. Memory sub-system controllers (e.g., a processing devices) usually write to media randomly in portions of host data (e.g., 4 KB), and then use metadata to map LBA space to the physical address space of the memory device. When a larger group of host data (e.g., 100 megabyte (MB) or more) is written grouped with data locality, however, the "data group" can be sequentially written as a larger chunk to one or more block sets across multiple dice. In order to simplify mapping of such data groups, LBA values of a zone (e.g., logical address space associated with a data group) can be sequentially ordered within the LBA space and be mapped to sequentially ordered physical addresses within the physical address space. In other words, the data group can be associated with LBA space zone having multiple sequential LBA values that are sequentially mapped to multiple sequential physical addresses. Memory sub-systems that can write (e.g., program) zones of data at a time and map the zones accordingly operate in zone namespace (ZNS), e.g., where a zone of logical addresses are named/identified as a group. Advantageously, use of ZNS for logical-to-physical (LTP) address mapping greatly reduces the amount of metadata to track the LTP mapping.

In memory sub-systems, read requests (or read operations) are usually issued one command tag at a time to a translation processor (e.g., that translates a logic address to a physical address) of the memory sub-system controller, resulting in random reads at a granularity specified by the command tag. A command tag, also referred to as a system tag (e.g., systag), includes a logical transfer unit (LTU) value and a buffer address identifying a buffer (e.g., a slot or entry in volatile memory) in which the contents corresponding to the transfer unit are stored as if in a cache. The LTU value, which in one embodiment corresponds to a 4 kilobyte (KB) portion of data, is a subset of the multiple sequential LBA values that can be mapped to a physical address via a set of mapping data structures. Accordingly, to generate an LTU value, a command generation processor of the controller can combine an LBA value of a read request with additional LBA values (which can also be received in read requests) that are sequential to the LBA value. Each LTU value can be translated to a logical block or a logical page depending on LTU type. An LTU, for example, can correspond to 8 KB, 16 KB, 32 KB, or more in increments of 4 KB or 8 KB of data.

Because read requests are conventionally performed one command tag at time, each read request generates a command message (e.g., a mailbox message in one example) into the command generation processor of the controller (regardless if the read is sequential) and generates multiple (e.g., four or more) data structure lookups for mapping the LBA of the read request to a physical location in the memory device, as will be explained in detail. A command message can be used post fetching of a non-volatile memory command, where the command generation processor notifies the translation processor about receipt of the command. These data structures (e.g., tables) can be stored in volatile memory. This manner of handling read requests increases overhead and lowers overall performance by increasing latency, especially given that some read requests are issued sequentially to sequentially written physical address spaces (e.g., of ZNS). Accordingly, the sequential data layout from sequential writes is not leveraged to limit the number of lookups that the controller (e.g., the translation processor of the controller) has to perform to determine the physical address from which to retrieve the data to fulfill a read request.

Aspects of the present disclosure address the above and other deficiencies by a command generation processor of a memory sub-system controller (e.g., processing device) generating a set of command tags that direct a command execution processor to read an amount of sequentially-written data (e.g., sequential data) into a set of buffers. The amount of sequential data read into the set of buffers can be significantly more than requested by a particular read request. By performing a read lookahead of this sequential data, a command generation processor of the controller can access the sequential data as if accessing cache to fulfill subsequent read requests without having to perform address translation of sequentially numbered LTU values. To do so, the command generation processor can further create and update a read cache table and a read index table to manage use of the set of buffers as cache to fulfill these subsequent read requests. Thus, when a read request is received that is known to be within a read offset value of the LBA value of the original read request, determination of an offset within the read offset value of the data allows determining the location of the requested data within the set of buffers. The controller can then transfer the requested data to the host system in response to a cache "hit" at the set of buffers.

In various embodiments, the read cache table stores, in each entry, optionally a zone identifier for the zone of the LBA in the read request, a starting LBA value set to the first LBA value (e.g., received in the original read request or read command), and the read offset value. The zone identifier is optional as the starting LBA value identifies the zone as well. Each entry in the read cache table can optionally also store an ending LBA value, which identifies an end of the read offset value, within physical address space, from the starting LBA. The read offset value can be the amount of data that is to be read into the set of buffers in a lookahead fashion, which can include the data corresponding to the original read request or command. The read offset value can, therefore, be significantly more than the amount of data mapped to an LTU, such as, for example, between 128 KB and 2 MB. In one example, if an LTU value is mapped to 16 KB of data, e.g., which is a buffer allocation unit offset, then 1 MB of data within the read offset value would include 64 chunks of data that correspond to 64 LTU values. The read lookahead of 1 MB of data can, therefore, save 63 additional sets of lookups by the translation processor to determine the physical address for 63 additional read requests. This kind of reduction in latency is substantial, particularly as extrapolated over thousands of read requests.

In the various embodiments, the command generation processor can create and manage the buffer index table to track an LTU value associated with each command tag of the set of command tags. The buffer index table, for example, can map the LTU value to the buffer address associated with the LTU value in each command tag. Thus, when a subsequent read request is received, after a new LTU value is determined (e.g., by an offset value from the original or first LTU value), the command generation processor can index into the buffer index table, using the new LTU value, to determine the corresponding buffer address. The command generation processor can then retrieve the requested data from the identifier buffer, and transfer the requested data to the host system to fulfill the subsequent read request. This indexing within the relatively small read cache table and buffer index table takes much less processing power and latency than would the translation processor in translating each LTU value to a separate physical address and separately fulfilling each request or command at a granularity of the logical transfer unit.

Advantages of the present disclosure include but are not limited to improved read performance and avoiding the heavy cost of interrupting write operations in order to service so many read requests (which occur more frequently than write operations), e.g., by allowing many read requests to hit in the buffers with read lookahead operations. Further, the present disclosure explains ways of performing direct cache hit and data transfer in order to lower latency on sequential read requests from the host system (even if those read requests are interspersed with write operations and/or read requests to other zones). These advantages synergistically leverage sequential writes performed by ZNS-enabled memory devices. Other advantages will be apparent to those skilled in the art of memory allocation and error optimization within a memory sub-system discussed hereinafter.

FIG. 1A illustrates an example computing system 100 that includes a memory sub-system 110 in accordance with some embodiments of the present disclosure. The memory sub-system 110 can include media, such volatile memory (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 are managed memory devices, which is a raw memory device combined with a local controller (e.g., the local media controller 135) for memory management within the same memory device package or memory die. An example of a managed memory device is a managed NAND (MNAND) device.

In some embodiments, the controller 115 includes an error-correcting code (ECC) encoder/decoder 111. The ECC encoder/decoder 111 can perform ECC encoding for data written to the memory devices 130 and ECC decoding for data read from the memory devices 130, respectively. The ECC decoding can be performed to decode an ECC codeword to correct errors in the raw read data, and in many cases also to report the number of bit errors in the raw read data.

Figure 1B:
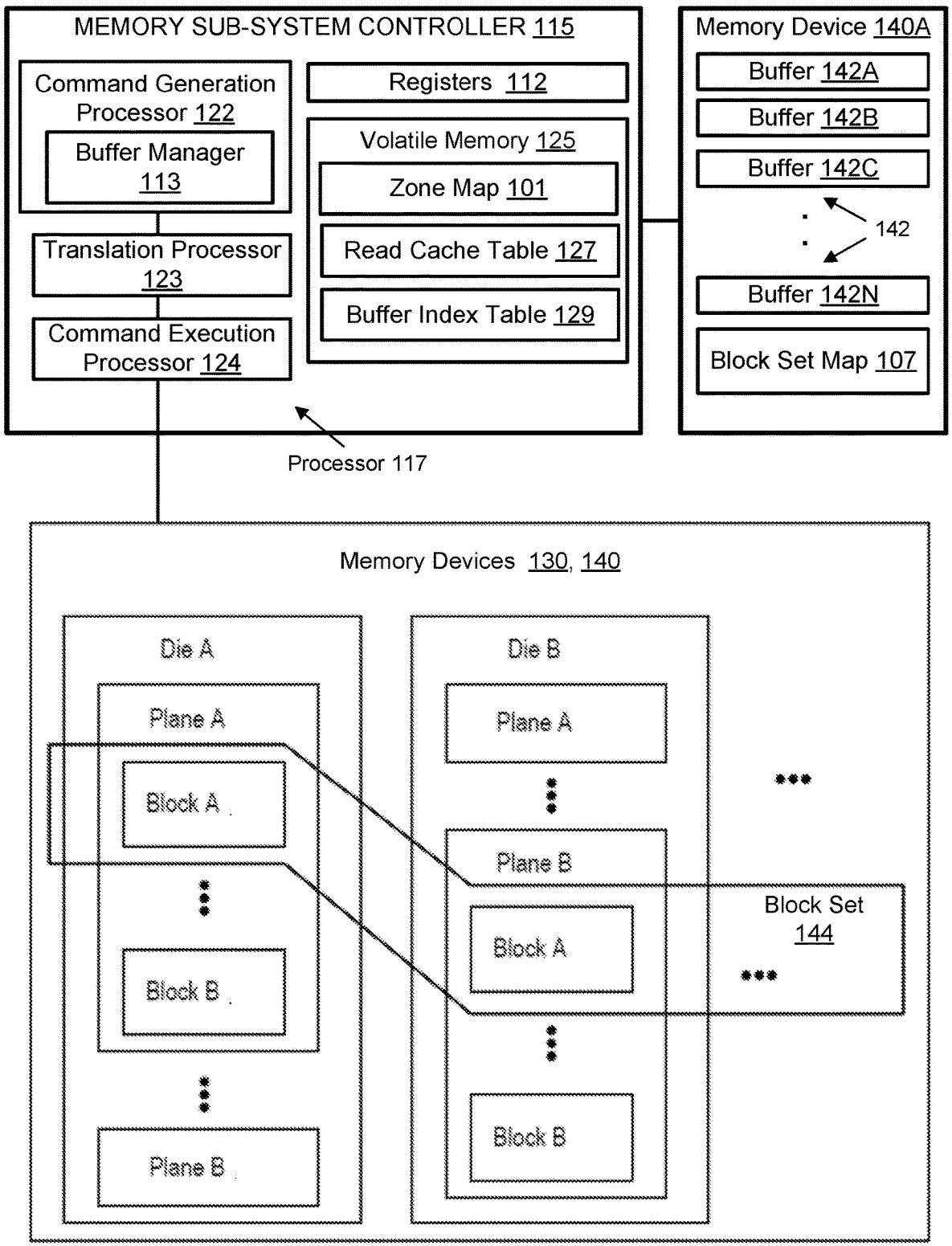
FIG. 1B illustrates the memory sub-system of FIG. 1A in additional detail according to an embodiment.

FIG. 1B illustrates the memory sub-system 110 of FIG. 1A in additional detail according to an embodiment. In the embodiment, the memory sub-system controller 115 (e.g., processing device, referred to as controller 115 for simplicity) includes one or more registers 112, a command generation processor 122, which includes a buffer manager 113, a translation processor 123, a command execution processor 124, and volatile memory 125. For example, the processor 117 (FIG. 1A) can include the command generation processor 123, the translation processor 123, and the command execution processor 124.

In various embodiments, the volatile memory 125 stores a zone map data structure 101, a read cache table 127, and a buffer index table 129, among other ZNS mapping data structures as illustrated by way of example in FIG. 2. In one embodiment, the zone map data structure 101 includes multiple entries, such that each entry has a block set entry identifier that links to an entry within a block set map data structure 107, which in turn can link to an entry of a page map data structure, which in turn locates a page in memory, as will be explained in detail with reference to FIG. 2. In some embodiments, the volatile memory 125 includes one or both of tightly coupled memory (TCM) and a static random access memory (SRAM) device. Storing the read cache table 127 and the buffer index table 129 in TCM can make the below discussed buffer management as efficient as possible, but can also be stored in the SRAM device or a combination thereof.

The memory sub-system 110 can further include a memory device 140A, which can be a dynamic random access memory (DRAM) device or other such volatile memory device, and which is generally adapted to store larger data structures. One such data structure can be the block set map data structure 107, which can map block set identifiers to individual blocks of data in the physical address space. The memory device 140A can also be referred to as a shared volatile memory in being shared by multiple processors in order to execute instructions and store data.

In various embodiments, the memory device 140A can further store the block set map data structure 107 and buffers 142, illustrated by way of example to include a first buffer 142A, a second buffer 142B, a third buffer 142C, and so on to an Nth buffer 142N. Any group of these buffers 142 can be considered to be a set of buffers. The controller 115 can allocate the buffers 142 (e.g., by way of buffer addresses) to store (e.g., cache) data in fulfillment of read requests. Each buffer, for example, can be an addressed slot or entry of the volatile memory device 140A. Each buffer can store a page size of data or an amount of data to which an LTU is mapped.

Further, as previously discussed with reference to one or more memory device(s) 130, 140, the physical address space of the multiple dice (e.g., Die A and Die B) can be hierarchically organized by plane, block, and page. So, for example, each of Die A and Die B can include Plane A and Plane B, and each of Plane A and Plane B can include Block A and Block B. A block set (or block stripe) can be defined as a group of blocks arrayed across planes of multiple dice of the memory device(s). As illustrated, a block set 144 is arrayed to include Block A of Plane A of Die A, Block A of Plane B of Die B, and so forth, e.g., also of Plane C of Die C and on to further dice, if present and online.

In various embodiments, the translation processor 123 (and/or a dynamic data placer of the controller 115 coupled to the translation processor 123) dynamically determines a layout to place data associated with logical addresses in the units or memory components (also referred to as "IC dice") of the memory devices 130, 140. A layout specifies the mapping between the logical addresses used in commands received in the memory sub-system 110 (e.g., from the host system 120) and the physical memory locations in the IC dice of the memory sub-system 110.

The translation processor 123 can determine the layout for a portion of logical addresses of LBA space for the placement of data at the logical addresses associated with physical addresses of media of the memory device 130 or 140, e.g., based on the availability of the IC dice to write, program, store, commit data at the time of input/output scheduling in the memory sub-system 110. When IC die(s), including physical units within the IC die(s), are available for committing/programming data, a write command is scheduled for execution in the memory sub-system 110; and the translation processor 123 generates a portion of the layout for the write command and maps the logical address(es) used in the write command to map to memory locations within the IC die(s). The execution of the write command causes the memory sub-system 110 to commit/program data associated with the write command into the IC die(s).

Depending on availability of IC dice across the media and/or application of a sequential mapping scheme, the controller 115 can either sequentially write data groups (e.g., provided in a sequential stream of data locality) to fill up one IC die at a time or can sequentially write to multiple IC dice at a time, in parallel, e.g., to concurrently fill up the IC dice if the memory device. The mapping of the writes within the zones of the LBA space can also be done sequentially to simplify the calculations used to perform the mapping, as will be discussed in more detail with reference to ZNS mapping data structures. When there are multiple IC dice available, logical addresses (e.g., LBA or LTU values) used in the commands from multiple write streams can be mapped by the dynamically generated portion of the layout to the multiple IC dice respectively, such that there is no access collision in the execution of the commands from the multiple write streams.

In various embodiments, the translation processor 123 accesses certain ZNS mapping data structures (e.g., the zone map data structure 101 and the block set map data structure 107) in order to translate LBA values to physical block addresses (PBAs) of physical address space. The translation processor 123 in the context of flash media (e.g., NOR or NAND flash memory) can be referred to as flash translation layer (FTL). The mapping employed by the translation processor 123 can generally be assumed to involve a type of block mapping, e.g., block-level mapping or log-block mapping. Where data locality is detected or in a ZNS memory device, the translation processor 123 can map a group of blocks forming a zone, e.g., within the ZNS data structures, which can involve mapping sequentially numbered LBA values to sequentially numbered PAs. The use of the ZNS data structures, and their interrelation, for mapping LBA space of a zone to physical address space of the media is discussed in more detail with reference to FIG. 2.

In various embodiments, the command generation processor 122 performs command processing, to include processing read or write commands received from the host system 120, or generating read commands and write commands based on read and write requests, respectively received from the host system 120 or another requesting agent. As part of executing read requests, the buffer manager 113 of the command generation processor 122 can allocate a certain number (e.g., "a set") of the buffers having a capacity that matches an amount of data stored at the first physical address (mapped to by the LTU value created to include the LBA value of the read request) and at subsequent physical addresses that are sequentially numbered following the first physical address, e.g., within a read offset value that defines a read window size of the memory device. The data stored at the first physical address can be referred to as first data and that stored at the subsequent physical addresses can be referred to as second data for purposes of explanation. In one embodiment, the read offset value is 128 KB, allowing for read lookahead of an additional 124 KB of the second data beyond the first read request, although the read offset value can range up to 2 MB or more. Various other offset values or read window sizes are envisioned. For example, each subsequent physical address can be incremented by page number across a read window of sequential physical address space defined by the read offset value, to determine the subsequent physical addresses. Allocation and tracking of the buffers, by the buffer manager 113, facilitates read lookahead operation.

In these embodiments, the command generation processor 122 can further generate a set of command tags that are utilized to direct the command execution processor 124 of the processing device to retrieve the data from the first address and the subsequent addresses of the memory device 130 or 140, and store the data in the set of buffers. The command generation processor can 122 can further transmit, to the command execution processor 124, a group of commands including the set of command tags. In this way, each command tag of the set of command tags includes an LTU value that is mapped to a physical address of one of the respective sequential physical addresses. Each command tag also includes a buffer address corresponding to a buffer of the buffers 142 stored in the memory device 140A.

In related embodiments, the buffer manager 113 can track usage of the buffers 142 and be responsible for locking or freeing of the buffers when host commands hit on these buffers using any number of buffer management algorithms to track the data cached in various buffers by a number of possible applications. The buffer management algorithms can include, for example, a two-three tree algorithm (also referred to as 2-3 tree algorithm) in which the buffers 142 are sorted by LTU value (or LBA value), a linked list algorithm, or an N-way cache that employs a hash algorithm, among other cache-management algorithms.

For purposes of explanation, assume that reads commands are intermixed with write commands to more than one zone, but that three of the read commands includes a read command to zone zero ("0") having an LBA_0 value, a read command to zone 44 having an LBA_44 value, and a read command to zone 23 having an LBA_23 value. In performing a read lookahead, the buffer manager 113 can generate a set of command tags to read lookahead 1 MB of data (as the read offset value), which includes the first data and the second data. The command tags can include a buffer address as a way to allocate one of the buffers 142 to each LTU value of the set of LTU values that are identified as mapped to the read offset value worth of first data and second data.

TABLE 1

| Entry Number | Zone Identifier | Starting LBA Value | Ending LBA Value | Read Offset Value |
|---|---|---|---|---|
| 1 | 0 | 0 | 1024 | 1,024 KB |
| 2 | 44 | 4400 | 5424 | 1,024 KB |
| 3 | 23 | 2300 | 2454 | 1,024 KB |

In order to track and manage the allocation of the buffers 142, the buffer manager 113 can further create, and keep updated, the read cache table 127. For example, the buffer manager 113 can create an entry in the read cache table 127 for each read lookahead operation in order to track allocation of the buffers 142 to respective LTU values of each read lookahead set of command tags. Table 1 illustrates an example of what the read cache table 127 would look like based on the three read commands to the three different zones previously discussed. Each entry can include a zone identifier, a starting LBA value (e.g., of the original or first LBA retrieved from a read request or command), an ending LBA value, and a read offset value, e.g., 1 MB in this example. The zone identifier is optionally, however, because the starting LBA value also identifies the zone. The read offset value can be a predetermined system amount of read lookahead data that is fixed, while the ending LBA value can be an LBA value corresponding to an end of the read offset value, within physical address space, from the starting LBA value. The starting LBA value and the ending LBA value can define an LBA value range, e.g., a read window size, that corresponds to the read offset value in the physical address space. As noted, the read lookahead data includes the first data, corresponding to the first LTU value in each case, as well as the second data, corresponding to an additional 63 LTU values mapped to 63 additional chunks of data at corresponding ones of the sequential physical addresses of the memory device 130 or 140. The particular numbers cited to in the present example is for explanatory purposes only and can be different in different implementation or scenarios.

In various embodiments, the buffer manager 113 can further create and keep updated the buffer index table 129, in which sequentially read data cached in the buffers is indexed against discontinuous buffer numbers, as illustrated in Table 2. The data index, for example, can refer to the LTU values corresponding to the set of LTU values, which are included in the read lookahead command tags generated for read commands to be sent to the command execution processor. Each LTU value, for example, can be the "Data Index" indexed against a buffer address corresponding to the LTU value. The buffer address can thus be the "Buffer Index" in the example buffer index table 129 of Table 2.

TABLE 2

| Data Index (e.g., for 64 byte data) | Buffer Index |
|---|---|
| 0 | 0 |
| 1 | 3 |
| 2 | 4 |
| 3 | 1 |
| ... | ... |
| 63 | 230 |

Metadata that can be used by such buffer management algorithms (e.g., for tracking buffer allocation and usage) includes an LTU/LBA value (on which the data is sorted), a buffer address (or other buffer identifier used for indexing) that indicates at which buffer slot the data resides, and a buffer usage count that allows for multiple users (e.g., host applications) in separate read or write paths to be jointly tracked. In this way, the buffer manager 113 can manage multiple applications writing to and reading from multiple zones where any set of commands can be either writing to or reading from sequentially stored data, although allocated buffers may not be numbered sequentially, as illustrated in Table 2. If the data in the buffers is tracked, hardware acceleration can be used to facilitate the tracking and management of the data in the buffers.

Further by way of example, after the buffer manager 113 has created or updated the read cache table 127 as per Table 1 and the buffer index table 129 as per Table 2, assume the host system 120 subsequently issues read requests or commands to subsequent sequential LBA values, as illustrated in Table 3. For example, the sequential LBA values for zone zero ("0") can be LBA_0 plus 16 KB, followed by LBA_0 plus 32 KB, followed by LBA_0 plus 48 KB, and so forth. The value of 16 KB can be referred to as a buffer allocation unit offset in being the amount of data in the memory device that corresponds to an LTU value. The buffer manager 113 can then perform an offset calculation in each case and determine the LTU value associated with the LBA value retrieved from the subsequent read request. As illustrated, the read requests/commands are to sequentially numbered LTU values. The LTU values that are determined can be, for example, LTU_1, LTU_2, and LTU_3, respectively, which are illustrated in Table 3. Once the LTU value is known, the buffer manager 113 can index within the buffer index table 129 to determine the buffer address corresponding to the LTU value associated with the LBA value in the subsequent read command or request.

TABLE 3

| Zone 0 Read | Zone 0 LTUs | Zone 44 Read | Zone 44 LTUs | Zone 23 Read | Zone 23 LTUs |
|---|---|---|---|---|---|
| LBA_0 | LTU_0 | LBA_4400 | LTU_4400 | LBA_2300 | LTU_2300 |
| LBA_0 + 16K | LTU_1 | LBA_4400 + 16K | LTU_4401 | LBA_2300 + 16K | LTU_2301 |
| LBA_0 + 32K | LTU_2 | LBA_4400 + 32K | LTU_4402 | LBA_2300 + 32K | LTU_2302 |
| LBA_0 + 48K | LTU_3 | LBA_4400 + 48K | LTU_4403 | LBA_2300 + 48K | LTU_2303 |
| . | . | . | . | . | . |
| . | . | . | . | . | . |
| . | . | . | . | . | . |

By way of further explanation, assume the command generation processor 122 retrieves a second LBA value from a second request received from the host system 120. The buffer manager 113 can then determine, via access to the entry in the read cache table 127, that the second LBA value (LBA_16) is a single buffer allocation unit offset (16 KB) from the starting LBA value (LBA_0) and thus corresponds to a second LTU value (LTU_1) of the set of LTU values. The buffer manager 113 can further determine that the second LBA value is within an LBA value range corresponding to the read offset value (1,024 KB=1 MB), and is thus not out of range. The buffer manager 113 can further index, within the buffer index table 127, using the second LTU value, to retrieve a second buffer address (buffer index 3 in Table 2). The buffer manager 113 can then return, to the host system 120, a subset of the second data retrieved from a second buffer, of the set of the buffers, corresponding to the second buffer address.

In various embodiments, the buffer manager 113 further uses a flag (e.g., bit flag) or a counter to track whether or not any given buffer is being used in the read or write path. This can allow for a quick search time for a buffer to satisfy an inflight command (e.g., that is already being processed) and short search times to find a particular LBA, and thus whether the buffer can be used for a cache hit and direct transfer to the host system 120, instead of having to go back to the translation processor 123 for mapping. Coherency, due to retrieving data from the buffers, which perform like cache, should not be an issue as long as the zone map data structure 101 is checked first, which the command generation processor 122 will continue to do within the disclosed sequential read optimization. In some embodiments, the controller 115 includes at least a portion of the buffer manager 113. In other embodiments, or in combination, a controller and/or a processing device of the host system 120 includes at least a portion of the buffer manager 113. For example, the controller 115, or the processing device of the host system 120, can be configured to execute instructions stored in memory for performing the operations of the buffer manager 113 described herein. In some embodiments, the buffer manager 113 is implemented in an integrated circuit chip disposed in the memory sub-system 110. In other embodiments, the buffer manager 113 is part of an operating system of the host system 120, a device driver, or an application.

In these embodiments, the command execution processor 124 sequences write and read commands within a channel of a data bus to the memory device(s) 130, 140. The command execution processor 124 can further, in response to receipt of the read commands, retrieve the data from the first physical address and from the subsequent physical addresses of the memory device(s) 130, 140 to which the set of command tags point. Recall that each command tag includes an LTU value, which maps to a physical address, and identifies a buffer address within the buffers cached in the volatile memory device 140A. The command execution processor 124 can further store (e.g., cache) the data fulfilling the read commands into the allocated buffers according to respective buffer addresses of the set of command tags, which were generated by the command generation processor 122 and included within the group of commands sent to the command execution processor 124. The command execution processor 124 can further perform error handling in the physical layer, e.g., corresponding to the physical address space.

The translation processor 123 translates LTU values to physical addresses of the physical address space to facilitate generation of commands by the command generation processor 122 to the command execution processor 124. Accordingly, the translation processor 123 can act as an intermediary between the command generation processor 124 (which receives a memory request with an LBA value and creates an LTU value to include the LBA value) and the command execution processor 124 that needs to know the physical address of the physical layer to fulfill a command. In the present disclosure, regular use of the translation processor 123 for indexing into various ZNS mapping data structures can be avoided in read lookahead operations of sequential read optimization.

FIG. 2 is a block diagram that illustrates an example of data structures configured to support zone-based mapping according to various embodiments. The controller 115 can store the data structures illustrated in FIG. 2 in the local memory 119, e.g., in SRAM, or in memory components of the memory device 140, e.g., in DRAM. The controller 115 can also configure or implement the media layout (e.g., a layout of where a data group of a zone is to be located within physical address space) using the data structures of FIG. 2. In FIG. 2, a zone map data structure 201 is configured to provide media layout information for a zone in a namespace, e.g., the LBA space for ZNS operation. The zone map data structures 201 can be the same or similar to the zone map data structure 101 of FIG. 1B. The zone map data structure 201 can have multiple entries. Each zone map entry in the zone map data structure 201 identifies information about a zone, such as a starting LBA address 211 of the zone, a block set identifier 213 of the zone, a zone cursor value 215 of the zone, a state 217 of the zone, and the like.

The host system 120 writes data in the zone beginning at the LBA of the zone starting LBA identifier 211. The host system 120 writes data in the zone sequentially in the LBA space. After an amount of data has been written into the zone, the current starting LBA address for writing subsequent data is identified by the zone cursor value 215. Each write command for the zone moves the zone cursor value 215 to a new starting LBA address for the next write command for the zone. The state 217 can have a value indicating that the zone is empty, full, implicitly open, explicitly open, closed, and the like, to track progress of writing that zone.

In FIG. 2, a logical-to-physical block map data structure 203 is configured to facilitate the translation of LBA addresses into physical addresses in the IC dice. The logical-to-physical block map 203 can have multiple entries. An LBA value can be used as, or converted into, an index (e.g., an LTU value) for an entry in the logical-to-physical block map 203. The index can be used to look up an entry for the LBA value. Each entry in the logical-to-physical block map 203 identifies, for an LBA value, the physical address of a block of memory in the IC dice. For example, the physical address of the block of memory in the IC dice can include a die identifier 233, a block identifier 235, a page map entry identifier 237, and the like. A die identifier 233 identifies a specific IC die (e.g., Die A or Die B) of the memory device(s) 130, 140 of the memory sub-system 110. A block identifier 235 identifies a specific block of memory (e.g., NAND flash memory) within the IC die that is identified using the die identifier 233. A page map entry identifier 237 identifies an entry in the page map data structure 205.

The page map data structure 205 can have multiple entries. Each entry in the page map 205 can include a page identifier 251 that identifies a page of memory cells within a block of memory cells (e.g., NAND memory cells). For example, the page identifier 251 can include a word line number for the page and a sub block number for the page in the block of NAND memory cells. Further, the entry for the page can include a programming mode 253 of the page. For example, the page can be programmed in an SLC mode, an MLC mode, a TLC mode, or a QLC mode. When configured in the SLC mode, each memory cell in the page is to store one bit of data. When configured in the MLC mode, each memory cell in the page is to store two bits of data. When configured in the TLC mode, each memory cell in the page is to store three bits of data. When configured in the QLC mode, each memory cell in the page is to store four bits of data. Different pages in an integrated circuit die can have different modes for data programming.

In FIG. 2, the block set data structure 207 stores data controlling aspects of the dynamic layout for a zone. The block set data structure 207 can be the same or similar to the block set map data structure 107 of FIG. 1B. The block set data structure 207, which can be a table in one embodiment, can have multiple entries. Each block set entry in the block set data structure 207 identifies a number/count 271 of integrated circuit dice (e.g., Die A and Die B) in which data of the zone is stored. For each of the integrated circuit dice used for the zone, the block set entry of the block set data structure 207 has a die identifier 273, a block identifier 275, a page map entry identifier 277, a page map offset value, and the like.

The die identifier 273 identifies a specific IC die (e.g., Die A or Die B) in the IC dice of the memory sub-system 110, on which IC die subsequent data of the zone can be stored. The block identifier 275 identifies a specific block of memory (e.g., NAND flash memory or other media) within the IC die that is identified using the die identifier 273, in which block the subsequent data of the zone can be stored. The page map entry identifier 237 identifies a page map entry in the page map data structure 205, which identifies a page that can be used to store the subsequent data of the zone.

For example, a memory sub-system 110 receives multiple streams of write commands. In an embodiment, each respective stream in the multiple streams is configured to write data sequentially in a logical address space in one embodiment; and in another embodiment, a stream in the multiple streams is configured to write data pseudo-sequentially, or randomly in a logical address space in one embodiment. Each write stream includes a set of commands that are tagged to write, trim, overwrite a set of data together as a group. In the group, the data can be written in a logical space sequentially, randomly, or pseudo-sequentially. Preferably, the data in the group is written into an erase block set, where memory cells in the erase block set store data for the stream but not data from other streams. The erase block set can be erased to remove the data of the stream without erasing the data of other streams.

For example, each of the write streams is permitted to sequentially write at LBAs in a zone in a namespace allocated in the IC dice of the memory device(s) 130, 140 of the memory sub-system 110, but prohibited from writing data out of sequence in the LBA (or logical address) space. The translation processor 123 of the memory sub-system 110 identifies multiple physical (or erase) units in the memory sub-system 110 that are available to write data concurrently.

The translation processor 123 can select first commands from the multiple streams for concurrent execution in the multiple physical units that are available to write data. The translation processor 123 can generate and store, dynamically in response to the first commands being selected for concurrent execution in the multiple physical units, a portion of a layout that maps from logical addresses identified by the first commands in the logical address space to physical addresses of memory units in the multiple memory units.

The command execution processor 124 can execute the first commands concurrently by storing data into the memory units according to the physical addresses. For example, at the time of scheduling the first commands for execution, execution of second commands can be in progress in a subset of memory units of the IC dice of the memory sub-system 110. Thus, the subset of memory units used for the execution of the second commands are not available for the first commands. After the first commands are scheduled and the portion of the layout for the logical addresses used in the first commands is determined, the first commands can be executed in the multiple physical units concurrently and/or concurrently with the progress of the execution of the second commands in remaining physical units of the memory sub-system 110.

For example, after the identification of the multiple memory units (e.g., IC dice) that are available for the execution of next commands, the translation processor 123 can identify, from the block set data structure 207, the physical addresses that can be used to store data of the next commands. The physical addresses can be used to update the corresponding entries in the logical to physical block map data structure 203 for the LBA addresses used in the next commands.

For example, when an IC die is free to write data, the translation processor 123 can determine a command of a zone that can be written/programmed into the memory cells in the IC die. From the block set data structure 207, the translation processor 123 locates an entry for the zone, locates the block identifier 275 and the page map entry identifier 277 associated with the identifier 273 of the integrated circuit die, and uses the die identifier 273, the block identifier 275, and the page map entry identifier 277 to update the corresponding fields of the entry in the logical to physical block map data structure 203 for the LBA used in the command of the zone.

Figure 3:
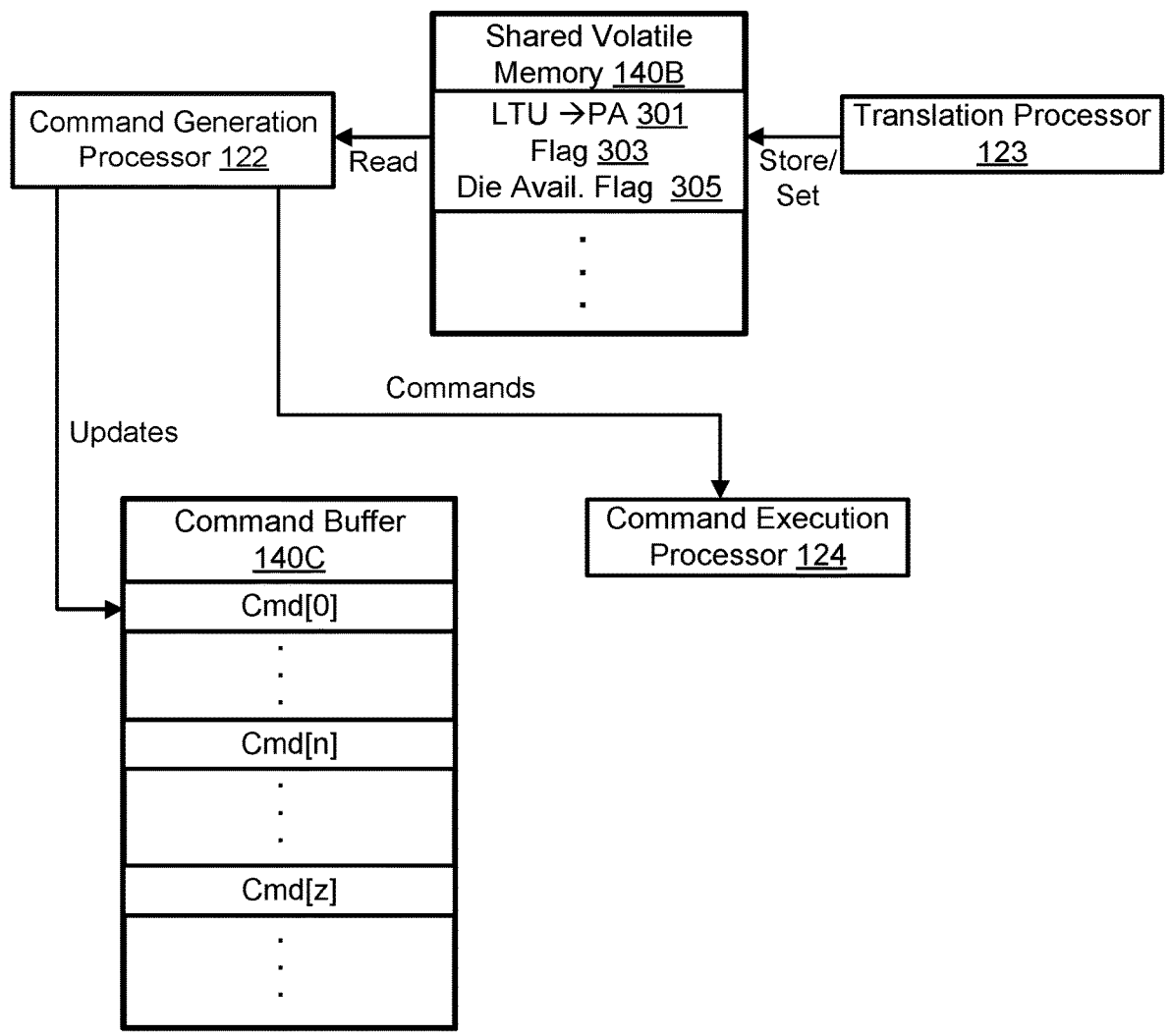
FIG. 3 is a block diagram of interrelationships of a command generation processor, a translation processor, and a command execution processor of a memory sub-system controller of FIGS. 1A-1B according to an embodiment.

FIG. 3 is a block diagram of interrelationships of the command generation processor 122, the translation processor 123, and the command execution processor 124 of the sub-system memory controller 115 of FIGS. 1A-1B according to an embodiment. In various embodiments, the controller 115 includes shared volatile memory 140B and a command buffer 140C in the shared volatile memory 140B. In one embodiment, the shared volatile memory 140B is part of the volatile memory 125 or the volatile memory device 140A discussed with reference to FIG. 1B. In various embodiments, the command generation processor 122 can receive a first read request from the host system 120 (or other requesting agent). The first read request can include a first LBA value, which corresponds to a first physical address of the memory device 130 or 140 to which the read operation is directed. In servicing the first read request, the command generation processor 122 can create a first logical transfer unit (LTU) value to include the first LBA value, the first LTU value to be mapped to the first physical address of a memory device(s) 130, 140.

In some embodiments, the translation processor 123 can be configured to automatically store (or buffer) LTU-to-physical address (PA) mappings 301 into the shared volatile memory 140B as their data is programmed into the memory device(s) 130, 140. For example, the LTU-to-PA mapping 301 can be a portion of the logical-to-physical block map data structure 203 and the page map data structure 205, to which were written when the respective physical addresses were programmed to the memory device 130 or 140. This can provide a quickly accessible data structure that provides just LTU-to-PA mapping at the command tag level. In some embodiments, the LTU-to-PA mappings 301 in the shared volatile memory 140B can be treated as cache to keep this data structure limited in size.

With continued reference to FIG. 3, the translation processor 123 can further selectively set a flag 303 (e.g., a bit flag or the like) in the shared volatile memory 140B. Each entry in the LTU-to-PA mappings 301 can therefore include a physical address mapped to an LTU value and a flag. In an alternative embodiment, a bit value of a bit map stored in the registers 112 (FIG. 1B) can be set. One of the bit values of the bit map can correspond to a particular LTU value and thus function as the flag 303 of the shared volatile memory 140B. The bit map can be correlated to the physical address space known to be sequentially written, e.g., per ZNS operation. The flag 303 (or bit value within the bit map) can indicate whether that LTU-to-PA mapping entry is associated with a zone of LBA address space, where the zone is mapped to data that is sequentially written in the memory device 130 or 140. The translation processor 123 can further selectively set a die available flag 305 to indicate that the die where the physical address is located is available to service commands. In some embodiments, where there are more than one die for a zone, there can be more than one flag, a flag per zone.

In various embodiments, if the flag 303 is set and the die available flag 305 are both set, the command generation processor 122 performs the read lookahead optimization disclosed herein. That read optimization can include, for example, auto-incrementing a first physical address retrieved from the LTU-to-PA mapping 301 for a first read request, to determine subsequent physical addresses within an offset value (e.g., a read window size) of the first physical address. In one embodiment, the auto-incrementing is performed to increment the first physical address by page number until reaching an end of the read window size from the first physical address.

The command generation processor 122 can then generate (or update), within the command buffer 140C, a set of command tags that are utilized to direct the command execution processor 124 to retrieve the data from the memory device 130 or 140 and store the data in a set of the buffers, which were discussed with reference to FIG. 1B. The command generation processor 122 can then further transmit, to the command execution processor 124 of the processing device, a group of commands respectively including one of the set of command tags. The set of commands can be buffered within the command buffer 140C as Cmd[0], Cmd[1], Cmd[2], and so forth through Cmd[n]. In one embodiment, the command generation processor 122 can interlink the set of command tags into a command chain (e.g., a chain of respective commands) and transmit the command chain in a single command message to the command execution processor 124.

After the command execution processor 124 has stored the data into the respective buffers allocated for a read lookahead of the first (or original) read command, the command generation processor 122 can return the data stored at first physical address to the host system 120 or other requesting agent. The command generation processor 122 can also, however, further service subsequent read requests or commands directed to the subsequent physical addresses directly out of the buffers as described herein. For example, in response to a second read request, the command generation processor 122 can determine that a second LBA value of the second read request corresponds to a second physical address, of the subsequent physical addresses. The command generation processor 122 can then retrieve a second subset of the data from a second buffer, of the set of the buffers, having a buffer address associated with a second command tag, of the set of command tags, and transmit the second subset of the data to the host system 120 in response to a first of the subsequent read commands.

FIG. 4 is a flow chart of a method 400 for supporting direct cache hits based on a read command according to an embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the controller 115 (e.g., the command generation processor 122) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic accesses a read command having a first command tag, where the first command tag includes a first logical transfer unit (LTU) value and a first buffer address for a first buffer of the buffers 142. The read command can, for example, be received from the host system 120 or generated by the processing logic based on contents of a read request received from the host system 120. The first LTU value is mapped from a zone of multiple sequential logical block address (LBA) values to a first physical address of multiple sequential physical addresses of the memory device 130 or 140. In this embodiment, first data is stored at the first physical address and the first LTU value contains a first LBA value of the multiple sequential LBA values.

At operation 420, the processing logic generates a set of command tags that are to direct a command execution processor of the processing device to retrieve second data from the memory device and store the second data in a set of the buffers. In this embodiment, for example, the set of command tags includes a second command tag associated with a second physical address that sequentially follows the first physical address, a third command tag associated with a third physical address that sequentially follows the second physical address, and so forth, through the number of command tags sufficient to populate commands to read in the second data along with the first data. This read lookahead can be performed without further translation work (by the translation processor 123) or read command execution work performed by the command execution processor 124 at the memory device 130 or 140.

At operation 430, the processing logic creates an entry in the read cache table 127 for the set of the buffers. For example, the entry can include a zone identifier for the zone, a starting LBA value set to the first LBA value, and a read offset value corresponding to an amount of the first data and the second data. The entry can further include an ending LBA value that corresponds to an end of the read offset value, within physical address space, from the starting LBA value. An example of the read cache table 127 is illustrated in Table 1.

Figure 5:
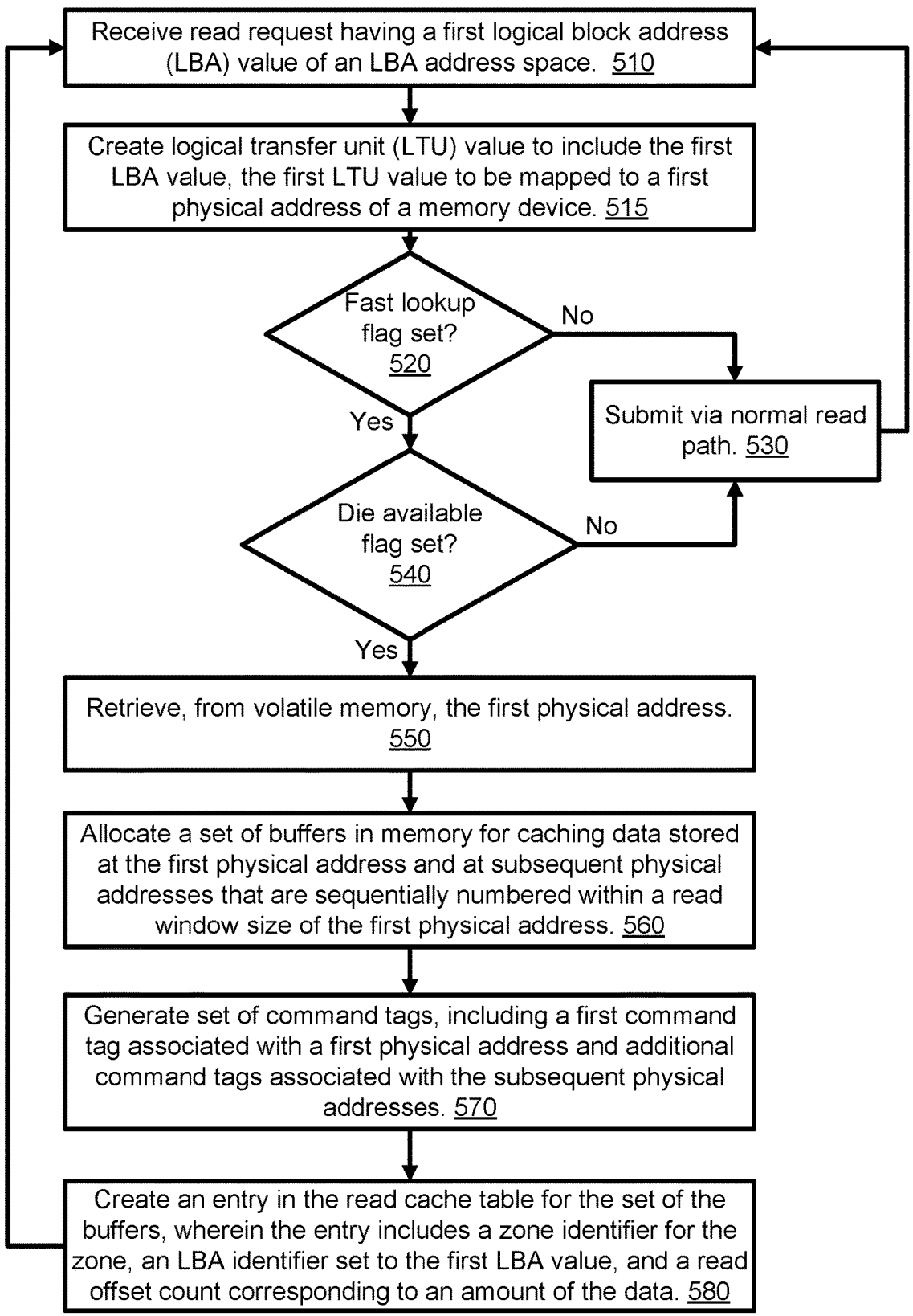
FIG. 5 is a flow chart of a method for supporting direct cache hits according to an embodiment.

FIG. 5 is a flow chart of a method 500 for sequential read optimization according to an embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the controller 115 (e.g., the command generation processor 122) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 5, at operation 510, the processing logic receives a read request that includes a first logical block address (LBA) value of an LBA address space for a memory device. At operation 515, the processing logic creates a first logical transfer unit (LTU) value to include the first LBA value, the first LTU value to be mapped to a first physical address of a memory device. The first LTU value need not be sent to the translation processor 123 as long as the translation processor 123 has already created an LTU-to-PA entry in the LTU-to-PA mappings 301 of the shared volatile memory 140B (FIG. 3). The processing logic can then access the first physical address indexed against the first LTU value within the shared memory 140B (FIG. 3).

With continued reference to FIG. 5, at operation 520, the processing logic determines whether a fast lookup flag is set. This fast lookup flag can be the flag 303, associated with the first physical address, set in the shared volatile memory 140B; or, the fast lookup flag can be a bit value in one of the registers 112 storing a bit map associated with ZNS-related physical address space of the memory device 130 or 140. In either case, the fast lookup flag can indicate that the first LTU value is associated with a zone of multiple sequential LBA values that are sequentially mapped to multiple sequential physical addresses. At operation 540, the processing logic determines whether the die available flag 305 is set, which was discussed with reference to FIG. 3.

At operation 530, if either the fast lookup flag or the die available flag is not set, the processing logic submits the read request via a normal read path that includes sending the first LTU value to the translation processor 123 for the translation processor 123 to do lookups, within the ZNS data structures, to map the first LTU to the first physical address.

At operation 550, assuming that the fast lookup flag and the die available flag is set with relation to the first LTU value, the processing logic retrieves, from the volatile memory (e.g., the shared volatile memory 140B in FIG. 3), the first physical address that was stored (or buffered) there by the translation processor 123. The first physical address can be indexed within an entry of the LTU-to-PA mappings 301 of the shared volatile memory 140B.

At operation 560, the processing logic allocates a set of buffers in the volatile memory, where a capacity of the set of buffers matches an amount of the data stored at the first physical address and at subsequent physical addresses that are sequentially numbered within a read window size, e.g., defined by the read offset value (Table 1) that starts at the first physical address, e.g., to which the first LTU value is mapped. The volatile memory that stores the buffers can be the volatile memory 125, the volatile memory device 140A, and/or the shared volatile memory 140B. In various embodiments, the processing logic determines each subsequent physical address by incrementing the first physical address by page number until reaching an end of the read window size (e.g., the offset value).

At operation 570, the processing logic generates a set of command tags that are to direct the command execution processor 124 of the processing device to retrieve the data from the memory device and store the data in the set of buffers. The set of command tags can include a first command tag associated with the first physical address and additional command tags associated with the subsequent physical addresses.

At operation 580, the processing logic creates an entry in a read cache table for the set of buffers, where the entry includes a zone identifier for the zone, a starting LBA value set to the first LBA value, and the read offset value corresponding to the amount of data. The entry can further include an ending LBA value that corresponds to an end of the read offset value, within physical address space, from the starting LBA value. The processing logic can then use the read cache table in order to identify that a subsequent request or command is directed at an LBA value corresponding to a physical address within the read offset value, and is thus stored with the set of buffers. The processing logic thus can retrieve a subset of the data stored in the buffers as a cache hit, and return the subset of the data to the host system 120 or other requesting agent.

FIG. 6A-6C are flow charts of a method 600 for supporting direct cache hits and transfer according to a related embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the controller 115 (e.g., the command generation processor 122) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 6A, at operation 605, the processing logic receives a read request that includes a first logical block address (LBA) value of an LBA address space for a memory device, where the first LBA value belongs to a zone of multiple sequential LBA values that are mapped to multiple sequential physical addresses. At operation 610, the processing logic creates a first logical transfer unit (LTU) value that includes the first LBA value, the first LTU value being mapped to a first physical address of the memory device 130 or 140.

At operation 615, the processing logic allocates a set of buffers (e.g., of the buffers 142) in the volatile memory, where a capacity of the set of buffers matches an amount of the data stored at the first physical address and at subsequent physical addresses that are sequentially numbered within a read offset value that starts at the first physical address. The volatile memory that stores the buffers can be the volatile memory 125, the volatile memory device 140A, or other shared volatile memory 140B. In various embodiments, the processing logic determines each subsequent physical address by incrementing the first physical address by page number until reaching an end of the read offset value.

At operation 620, the processing logic generates a set of command tags that are to direct a command execution processor of the processing device to retrieve the data from the memory device and store the data in the set of buffers. In this embodiment, the set of command tags includes at least a first command tag associated with the first physical address and a second command tag associated with a second physical address, of the subsequent physical addresses, that sequentially follows the first physical address. The set of command tags can include additional command tags, e.g., up to 64 total command tags with sequentially ordered LTU values where each LTU value corresponds to 16 KB of data and the read offset value of the read lookahead data is 1 MB.

At operation 625, the processing logic creates an entry in a read cache table for the set of buffers, where the entry includes a zone identifier for the zone, a starting LBA value set to the first LBA value, and the read offset value corresponding to the amount of data. The entry can further include an ending LBA value that corresponds to an end of the read offset value, within physical address space, from the starting LBA value. An example of the read cache table 127 is illustrated in Table 1.

With reference to FIG. 6B, the method 600 is executed in a context in which the set of command tags include a set of LTU values that correspond to a subset of the multiple sequential physical addresses within the read offset value. The portion of the method 600 in FIG. 6B can be viewed as additional detail with reference to generation of the set of command tags and generation of a buffer index table.

At operation 630, the processing logic assigns an LTU value, of the set of LTU values, to each command tag of the set of command tags. The LTU value can be assigned sequentially and can correspond to increments of the buffer allocation unit (e.g., 16 KB in the above example) starting at the starting LBA value. At operation 635, the processing logic assigns a buffer address of a buffer within the set of buffers to each command tag of the set of command tags. This assignment can be part of the allocation of the set of buffers in the volatile memory as discussed at operation 615 of FIG. 6A. In one embodiment, the buffer addresses assigned to respective sequential LTU values are not necessarily sequential or consecutive, and thus the allocation within the buffer index table can be managed by a buffer management algorithm as previously discussed.

At operation 640, the processing logic generates a buffer index table, in the volatile memory, to track the LTU value associated with each command tag of the set of command tags mapped to the buffer address associated with the LTU value. An example of the buffer index table 129 is illustrated in Table 2. The processing logic can also track entries of the buffer index table according to one of a linked list or a two-three tree algorithm in which the set of buffers are sorted by LTU value. In this way, the processing logic can access the buffer index table 129 after determining a subsequent LTU value associated with a current read request or command and locate the corresponding buffer of the set of buffers that contains the requested data.

More specifically, with reference to FIG. 6C and use of Tables 1 and 2, the method 600 is executed to fulfill subsequent read requests or read commands in a cache-type access, pulling data from the set of buffers instead of engaging the translation processor 123 or the command execution processor 124 to pull data from the memory device 130 or 140. At operation 645, the processing logic retrieves a second LBA value from a subsequent read request or command received from the host system 120. For example, for purposes of explanation, the second LBA value is (LBA_16).

At operation 650, the processing logic determines, via access to the entry in the read cache table 127, that the second LBA value is a buffer allocation unit offset (e.g., 16 KB) from the starting LBA value (LBA_0) and thus corresponds to a second LTU value (e.g., LTU_1) of the set of LTU values and is within an LBA value range corresponding to the read offset value. At operation 660, the processing logic indexes, within the buffer index table 129, using the second LTU value, to retrieve a second buffer address, e.g., buffer index 3 in Table 2. Other values of indexing or addressing related to positions within the volatile memory are envisioned and manageable by the buffer manager as discussed. At operation 665, the processing logic returns, to the host system 120, a subset of the data retrieved from a second buffer, of the set of buffers, corresponding to the second buffer address in response to a cache hit at the set of buffers. In this way, the processing logic can also improve read performance and avoids the heavy cost of interrupting write operations in order to service so many read requests (which occur more frequently than write operations), e.g., by allowing many read requests to hit in the buffers with read lookahead operations.

The portions of the method 600 depicted in FIG. 6C can be extended to further or subsequent read requests or read commands. For example, the processing logic can retrieve a third LBA value from a subsequent read request received from a host system. The processing logic can further determine, via access to the entry in the read cache table, that the third LBA value is twice a buffer allocation unit offset from the starting LBA value and thus corresponds to a third LTU value of the set of LTU values and is within an LBA value range corresponding to the read offset value. The processing logic can further index, within the buffer index table, using the third LTU value, to retrieve a third buffer address. The processing logic can further return, to the host system, a subset of the data retrieved from a third buffer, of the set of buffers, corresponding to the third buffer address.

Figure 7:
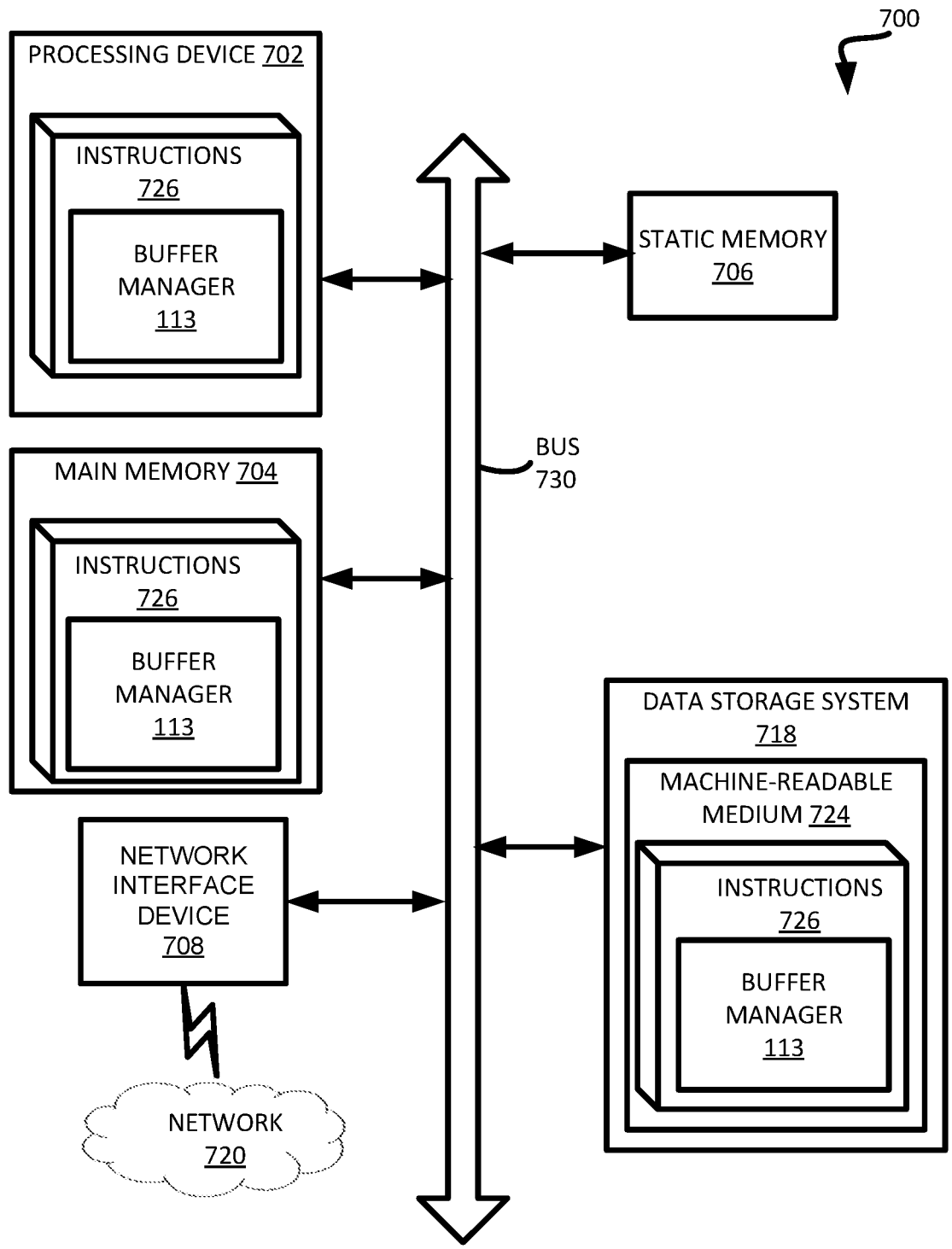
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a non-transitory computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIGS. 1A-1B.

In one embodiment, the instructions 726 include instructions to implement functionality corresponding to the buffer manager 113 of FIG. 1B. While the machine-readable storage medium 724 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device;
a volatile memory comprising buffers and a read cache table; and
a processing device coupled to the memory device and to the volatile memory, wherein the processing device is to:

access a read command having a first command tag, the first command tag comprising a first logical transfer unit (LTU) value and a first buffer address for a first buffer of the buffers, the first LTU value being mapped from a zone of a plurality of sequential logical block address (LBA) values to a first physical address of a plurality of sequential physical addresses of the memory device, wherein first data is stored at the first physical address, and wherein the first LTU value contains a first LBA value of the plurality of sequential LBA values;

generate a set of command tags that are to direct a command execution processor of the processing device to retrieve second data from the memory device and store the second data in a set of the buffers, wherein the set of command tags comprises at least a second command tag associated with a second physical address that sequentially follows the first physical address; and create an entry in the read cache table for the set of the buffers, wherein the entry comprises a starting LBA value set to the first LBA value and a read offset value corresponding to an amount of the first data and the second data.

2. The system of claim 1, wherein the processing device is further to:
receive a read request comprising the first LBA value;
generate the first LTU value to include the first LBA value;
read, from the volatile memory, a flag to determine that the first LTU value is associated with the zone; and
populate the read command with the first LTU value and the first buffer address.

3. The system of claim 1, wherein the processing device is further to transmit, to the command execution processor, a group of commands respectively comprising one of the set of command tags, and in response to receipt of the set of command tags, the command execution processor is to retrieve the second data from the memory device and store the second data in the set of the buffers according to respective buffer addresses of the set of command tags.

4. The system of claim 1, wherein the entry further comprises an ending LBA value corresponding to an end of the read offset value, within physical address space, from the starting LBA value.

5. The system of claim 4, wherein each of the buffers is to store between 8 kilobytes and 32 kilobytes of data, and wherein the read offset value is between 128 kilobytes and 2 megabytes of data.

6. The system of claim 1, wherein the set of command tags comprise a set of LTU values that correspond to a subset of the plurality of sequential physical addresses within the read offset value, and wherein each command tag of the set of command tags comprises:
an LTU value, of the set of LTU values, that is mapped to a physical address of the subset of the plurality of sequential physical addresses; and
a buffer address of a buffer within the set of the buffers; and
wherein the processing device is further to generate a buffer index table, in the volatile memory, to track the LTU value associated with each command tag of the set of command tags indexed against the buffer address associated with the LTU value.

7. The system of claim 6, wherein entries of the buffer index table are tracked according to one of:
a linked list;
a two-three tree algorithm in which the buffers are sorted by LTU value; or
an N-way cache that employs a hash algorithm.

8. The system of claim 6, wherein the processing device is further to:
retrieve a second LBA value from a second read request received from a host system;
determine, based on the entry in the read cache table, that the second LBA value:
is a single buffer allocation unit offset from the starting LBA value and thus corresponds to a second LTU value of the set of LTU values; and
is within an LBA value range corresponding to the read offset value;
index, within the buffer index table, using the second LTU value, to retrieve a second buffer address; and
return, to the host system, a subset of the second data retrieved from a second buffer, of the set of the buffers, corresponding to the second buffer address.

9. A method comprising:
receiving, by a processing device of a processing device, a read request comprising a first logical block address (LBA) value of an LBA space for a memory device, wherein the LBA value belongs to a zone of a plurality of sequential LBA values that are mapped to a plurality of sequential physical addresses;
creating, by the processing device, a first logical transfer unit (LTU) value to include the first LBA value, the first LTU value being mapped to a first physical address of the memory device;
allocating, by the processing device, a set of buffers in a volatile memory, wherein a capacity of the set of buffers matches an amount of data stored at the first physical address and at subsequent physical addresses that are sequentially numbered within a read offset value that starts at the first physical address;
generating, by the processing device, a set of command tags that are to direct a command execution processor of the processing device to retrieve the data from the memory device and store the data in the set of buffers, wherein the set of command tags comprises a first command tag associated with the first physical address and a second command tag associated with a second physical address that sequentially follows the first physical address; and
creating, by the processing device, an entry in a read cache table for the set of buffers, wherein the entry comprises a starting LBA value set to the first LBA value and the read offset value corresponding to the amount of data.

10. The method of claim 9, further comprising reading, from the volatile memory, a bit value of a bit map to determine that the first LTU value is associated with the zone of the LBA space.

11. The method of claim 9, wherein creating the entry further comprises storing, within the entry, an ending LBA value corresponding to an end of the read offset value, within physical address space, from the starting LBA value.

12. The method of claim 9, further comprising transmitting, to the command execution processor of the processing device, a group of commands respectively comprising one of the set of command tags, and in response to receipt of the set of command tags, the command execution processor retrieving the data from the memory device and storing the data in the set of buffers according to respective buffer addresses of the set of command tags.

13. The method of claim 9, wherein the set of command tags comprise a set of LTU values that correspond to a subset of the plurality of sequential physical addresses within the read offset value, and wherein generating the set of command tags further comprises:
assigning an LTU value of the set of LTU values to each command tag of the set of command tags; and
assigning a buffer address of a buffer within the set of buffers to each command tag of the set of command tags; and
wherein the method further comprises generating a buffer index table, in the volatile memory, to track the LTU value associated with each command tag of the set of command tags mapped to the buffer address associated with the LTU value.

14. The method of claim 13, further comprising tracking entries of the buffer index table according to one of:
a linked list;
a two-three tree algorithm in which the set of buffers are sorted by LTU value; or
an N-way cache that employs a hash algorithm.

15. The method of claim 13, the method further comprising:
retrieving a third LBA value from a subsequent read request received from a host system;
determining, via access to the entry in the read cache table, that the third LBA value:
is twice a buffer allocation unit offset from the starting LBA value and thus corresponds to a third LTU value of the set of LTU values; and
is within an LBA value range corresponding to the read offset value;
indexing, within the buffer index table, using the third LTU value, to retrieve a third buffer address; and
returning, to the host system, a subset of the data retrieved from a third buffer, of the set of buffers, corresponding to the third buffer address.

16. A non-transitory computer-readable medium storing instructions, which when executed by a processing device of a sub-system memory controller, cause the processing device to perform a plurality of operations comprising:
receiving a read request comprising a first logical block address (LBA) value of an LBA space for a memory device, wherein the LBA value belongs to a zone of a plurality of sequential LBA values that are mapped to a plurality of sequential physical addresses;
creating a first logical transfer unit (LTU) value to include the first LBA, the first LTU value being mapped to a first physical address of the memory device;
allocating a set of buffers in a volatile memory, wherein a capacity of the set of buffers matches an amount of data stored at the first physical address and at subsequent physical addresses that are sequentially numbered within a read offset value that starts at the first physical address;
generating a set of command tags that are to direct a command execution processor of the processing device to retrieve the data from the memory device and store the data in the set of buffers, wherein the set of command tags comprises a first command tag associated with the first physical address and a second command tag associated with a second physical address that sequentially follows the first physical address; and
creating an entry in a read cache table for the set of buffers, wherein the entry comprises a starting LBA value set to the first LBA value and the read offset value corresponding to the amount of data.

17. The non-transitory computer-readable medium of claim 16, wherein the plurality of operations further comprises transmitting, to the command execution processor of the processing device, a group of commands respectively comprising one of the set of command tags, and in response to receipt of the set of command tags, the command execution processor retrieving the data from the memory device and storing the data in the set of buffers according to respective buffer addresses of the set of command tags.

18. The non-transitory computer-readable medium of claim 16, wherein the set of command tags comprise a set of LTU values that correspond to a subset of the plurality of sequential physical addresses within the read offset value, and wherein generating the set of command tags further comprises:
assigning an LTU value of the set of LTU values to each command tag of the set of command tags; and
assigning a buffer address of a buffer within the set of buffers to each command tag of the set of command tags; and
wherein the plurality of operations further comprises generating a buffer index table, in the volatile memory, to track the LTU value associated with each command tag of the set of command tags mapped to the buffer address associated with the LTU value.

19. The non-transitory computer-readable medium of claim 18, wherein the plurality of operations further comprises tracking entries of the buffer index table according to one of:
a linked list;
two-three tree algorithm in which the set of buffers are sorted by LTU value; or
an N-way cache that employs a hash algorithm.

20. The non-transitory computer-readable medium of claim 18, wherein the plurality of operations further comprises:
retrieving a second LBA value from a subsequent read request received from a host system;
determining, via access to the entry in the read cache table, that the second LBA value:
is a single buffer allocation unit offset from the starting LBA value and thus corresponds to a second LTU value of the set of LTU values; and
is within an LBA value range corresponding to the read offset value;
indexing, within the buffer index table, using the second LTU value, to retrieve a second buffer address; and
returning, to the host system, a subset of the data retrieved from a second buffer, of the set of buffers, corresponding to the second buffer address.

* * * * *